UNITED STATES PATENT OFFICE.

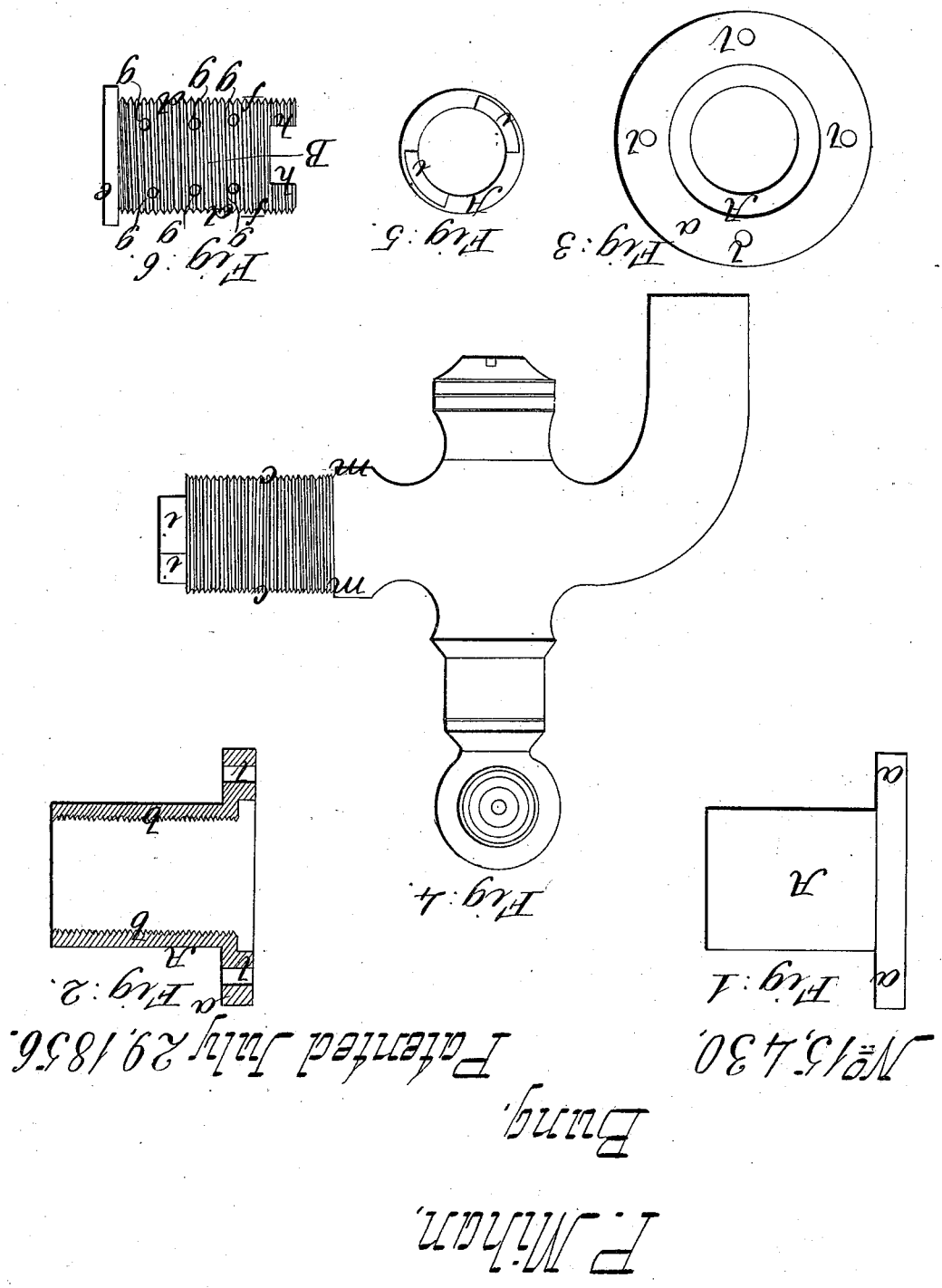

PATRICK MIHAN, OF BOSTON, MASSACHUSETTS.

METHOD OF INSERTING FAUCETS INTO FLUIDS UNDER PRESSURE.

Specification of Letters Patent No. 15,430, dated July 29, 1856.

*To all whom it may concern:*

Be it known that I, PATRICK MIHAN, of Boston, in the county of Suffolk and State of Massachusetts, have invented a new and useful article or contrivance, which I term a "Faucet-Receiver;" and I do hereby declare that such is fully described and represented in the following specification and the accompanying drawings, of which—

Figure 1, exhibits an external view of the same; Fig. 2, a longitudinal section of it; Fig. 3, a view of its receiving end; Fig. 4, a side view of a faucet adapted to said receiver. Fig. 5, is a view of the rear end of the screw of said faucet; Fig. 6, a side view of the thimble to be hereinafter described.

My invention is particularly designed for the use of brewers and distillers and it is intended for the purpose of enabling them either to readily apply to or remove from a cask or vessel, a faucet, or cock for drawing ale or a liquid from said vessel.

It is well known that when the faucet hole of a cask is stopped by a plug bung or cork, the application of a faucet to such hole is often attended with a considerable loss of liquor from the cask. The causes of this loss are so well understood by most persons as to render it unnecessary to describe them.

My invention is intended to prevent such loss or escape of liquid and in carrying it (such invention) out, I employ what I term a socket tube A which is a cylindrical tube constructed with a flanch or collar, $a$, and with a female screw $b$, extending through its bore, such screw being made so as to correspond with and receive the screw, $c$, of the faucet shown in Fig. 4. In connection with such socket tube, I make use of a thimble, B, which consists of a cylindrical tube, $d$, open at one end and closed at the other, the closed end being constructed with a collar or flanch, $e$, projecting from it as shown in the drawings. This thimble has a male screw, $f$, formed on its outer cylindric surface and of a diameter and size to fit and enter a female screw, $b$, of the socket tube A. Besides the above the tube, $d$, of said thimble is perforated with holes, $g$, $g$, and its open end is provided with locking recesses, $h$, $h$, for the reception of bits or projections $i$, $i$, extending from the screw of the faucet as shown in Figs. 4, and 5.

When the faucet and thimble are applied together end to end and so that the bits of the one shall enter the recesses of the other, the former serves as a key to rotate the latter within the socket tube and when the faucet is turned in one direction so as to cause it to screw into the socket tube, the thimble will be revolved by and with it, and be unscrewed from the socket tube in proportion as the faucet is screwed into the same. So while the faucet is being unscrewed from the socket tube, the thimble will be screwed into the latter, and when all the lateral holes or passages, $g$, $g$, are covered by the socket tube no liquid from the cask or vessel can pass through said holes and into the faucet or escape out of the cask and into the thimble, but whenever the faucet is screwed into the socket tube far enough to cause any one or more of the holes, $g$, to be uncovered by the socket tube, the liquid will flow freely into the thimble and from thence into the faucet from which it may be discharged by opening the latter in the usual way. The socket tube, under such a state of things, should be presumed to be fitted into either the head or side of a cask or reservoir containing liquid, also said tube is fastened in place by screws extending through holes, $l$, $l$, made through the flanch.

I would further remark that in order to make close joints between the flanch of the thimble, and the adjacent end of the socket tube, or between the flanch of the socket tube, and the shoulder, $m$, of the faucet a common washer of leather or other suitable material may be employed and placed either on the thimble or the screw of the faucet, so as to be compressed between the contiguous surfaces, when they are made to approach close to the washer.

I claim—

The faucet receiver as composed of the socket tube A, and the perforated thimble, B, applied together by means of screws and operated by the action of the faucet substantially in manner and for the purpose as specified.

In testimony whereof, I have hereunto set my signature this fourteenth day of June A D 1856.

PATRICK MIHAN.

Witnesses:
R. H. EDDY,
F. P. HALE, Jr.